United States Patent [19]

Yamagishi et al.

[11] Patent Number: 5,239,526
[45] Date of Patent: Aug. 24, 1993

[54] DATA RECORDING/REPRODUCING APPARATUS OF SPIRAL TRADE SYSTEM WITH KICK BACK CONTROL

[75] Inventors: Toru Yamagishi, Yokosuka; Koji Tanaka, Yokohama; Takaro Mori, Chigasaki, all of Japan

[73] Assignee: VictorCompany of Japan, Ltd., Yokohama, Japan

[21] Appl. No.: 605,388

[22] Filed: Oct. 30, 1990

[30] Foreign Application Priority Data

Oct. 31, 1989 [JP]  Japan .................................. 1-284091

[51] Int. Cl.$^5$ .......................... G11B 7/00; G11B 5/596
[52] U.S. Cl. ........................................ 369/32; 369/54; 369/58; 369/44.28; 360/78.14
[58] Field of Search ................... 369/32, 54, 43, 44.32, 369/44.33, 58, 50, 44.28; 360/78.04, 78.14; 358/907

[56] References Cited

U.S. PATENT DOCUMENTS

| | | | |
|---|---|---|---|
| 4,561,026 | 12/1985 | Abè et al. .......................... | 369/50 X |
| 4,845,697 | 7/1989 | Giddings .............................. | 369/32 |
| 4,910,722 | 3/1990 | Kaji et al. ............................ | 369/32 |

*Primary Examiner*—Aristotelis Psitos
*Assistant Examiner*—P. W. Huber
*Attorney, Agent, or Firm*—Pollock, VandeSande & Priddy

[57] ABSTRACT

In an apparatus for recording/reproducing data on a disc along a spiral track, a track-turn position of a record/reproduce head is changed in response to a kick back signal determined by a value of the register and read/write error signal just after a sector pulse or an address signal in addition to the conventional access command which changes the track-turn position through calculation from address included in the access command and the present address. The change of the track-turn position by the kick back signal makes access time shorter than that which would be done by the conventional access command. Moreover, in such apparatus, execution of the kick back operation is determined at every N sectors, wherein $N = M - [T1/T2]$, where M is the number of sectors of one track turn; T1 is a time interval necessary for changing the record/reproduce head by one track-turn back; T2 is an interval necessary for scanning one sector by the record/reproduce head; and [T1/T2] shows a least natural number more than T1/T2. This makes timing of start for reading/writing earlier after the kick back operation.

3 Claims, 10 Drawing Sheets

| b0 | =0 | NOT KICK WHEN R/W SUCCEDS |
| --- | --- | --- |
|  | =1 | KICK ON THE NEXT SECTOR WHEN R/W SUCCEDS |
| b1 | =0 | NOT KICK WHEN R/W FAILS |
|  | =1 | KICK ON THE NEXT SECTOR WHEN R/W FAILS |

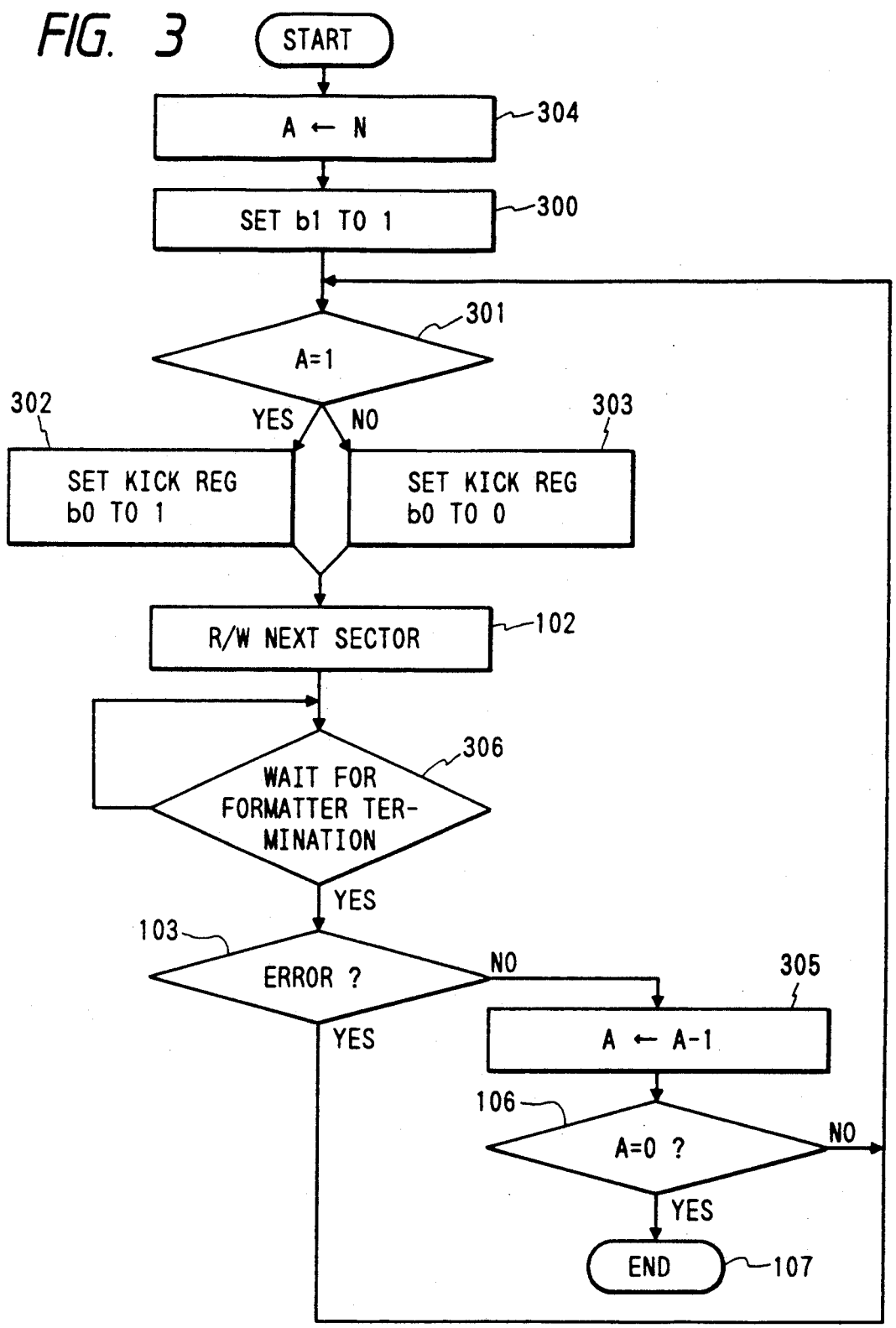

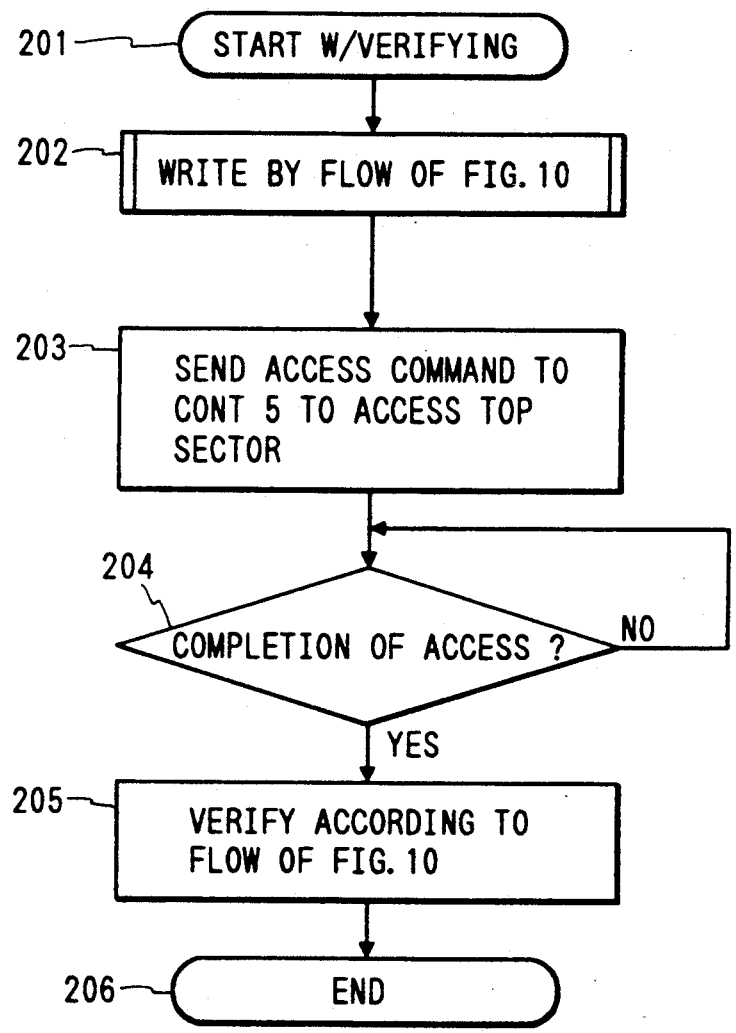

DATA RECORDING/REPRODUCING APPARATUS OF SPIRAL TRADE SYSTEM WITH KICK BACK CONTROL

BACKGROUND OF THE INVENTION

1. Field of the Invention

This invention relates to a data recording/reproducing apparatus of spiral track system with kick back control.

2. Description of the Prior Art

A data, recording/reproducing apparatus of spiral track system with kick back control which changes its track-turn position of the read/write head in accordance with a desired address, is known. FIG. 9 is a block diagram of such prior art recording/reproducing apparatus which comprises: a drive motor 2 for rotating a disc having a spiral track; a servo circuit 4 for driving the motor 2 and a read/write head (pick up) 3; a controller 5 for controlling a head position and rotation of the motor; the microprocessing unit (MPU) 8 receiving and sending data from/to an external computer unit 52 through an interface circuit 7; a data processing unit including a direct memory access (DMA) controller 10, a memory 9, an error correction circuit (ECC) 11, a formatter 14, and a read/write (r/w) signal processing circuit 6. In write mode, data received from the external computer unit 52 is stored in the memory 9 using the DMA controller 10. The ECC 11 adds error correction codes to the received data and sends them to the formatter 14 for formatting the data. The formatter 14 sends the data to the read/write processing circuit 6. The formatter 14 also checks errors of writing by checking address read from the disc 1. The read/write signal processing circuit 6 writes the data and other additional information, for example, error correction codes on the disc 1 along a spiral track by intermittently turning on a laser provided in the read/write head 3. In read mode, data is read by the read/write head 3 and received by the read/write signal processing circuit 6. The read data is deformatted by the formatter 14 which checks read errors and sends the result to the microprocessing unit 8 as an error signal.

When an error occurs during reading/writing data, the microprocessing unit 8 sends a command to the controller 5 to read/write again the sector just read/written. The microprocessing unit 8 sends the command in accordance with a flow chart shown in FIG. 10.

In FIG. 10, the microprocessing unit 8 starts to read or write at step 101. In step 103, the microprocessing unit 8 detects a read/write error signal from the formatter 14. In step 104, the microprocessing unit 8 sends the command for changing one track-turn (the spiral defined by one rotation of the disc 1) position of the head 3 back, i.e., kick back, to the controller 5. Then, the formatter 14 waits for the address just read/written. Therefore, it takes a relatively long interval to respond to the command because it takes a long time to perform an address calculation to determine how many track turns the position of the head 3 should be changed and to calculate the rotational velocity. In other words, timing relation between error detection and changing head position needs to be quite precise even if the head position is changed by only one track turn. In the following step 105, the microprocessing unit 8 waits completion of access of the head 3. An interval of this waiting is long because the controller 5 determines to move the head 3 by one track turn back after calculation of address of the desired track turn and the present address, as mentioned above.

Moreover, in the above-mentioned apparatus, there is a drawback that it is impossible to perform writing and verifying operation continuously. The verification operation is performed in accordance with a flow chart of FIG. 11. In FIG. 11, the microprocessing unit 8 starts write/verification in step 201. At first, the microprocessing unit 8 writes data in accordance with the steps shown in FIG. 10 in the following step 202. In the succeeding step 203, the microprocessing unit 8 sends an access command to the controller 5 so as to change track-turn position of the head 3 by two track turns back to of access of the head 3 to the top sector. In the following step 204, the microprocessing unit 8 detects completion of access of the head 3 by detecting an address of the top sector. After access of the head 3, in step 205, the microprocessing unit 8 verifies data read according to the flow of FIG. 10 by comparing the data with stored data which was written on the disc 1. Therefore, it takes a relatively long interval to of access of the head to the top sector where data has been just written. In other words, the time interval necessary for kick back operation is long. The reasons are as follows:

Unit length of recording and reading data is carried out at every track turn when verification is carried out so as to move the head by two track turns. Because if the head 3 is moved only one track turn, it cannot access the top sector which is just written because of the time interval necessary for moving the head. Therefore, there is the drawback that during verification, the head cannot kick back to the sector which has just been written.

SUMMARY OF THE INVENTION

The present invention has been developed to remove the above-described drawbacks inherent to the conventional data recording/reproducing apparatus of spiral track system with kick back control.

In a data recording/reproducing apparatus of spiral track system with kick back control, a track-turn position of a record/reproduce head is changed in response to a kick back signal which is determined by a state of read/write error signal and by a value set in the register just after a sector pulse or an address signal in addition to the conventional access command which changes the track-turn position through calculation from address included in the access command and the present address. The change of the track-turn position by the kick back signal makes access time shorter than that which would be done by the conventional access command. Moreover, in such apparatus, execution of the kick back operation is determined at every N sector wherein $N=M-[T1/T2]$, where M is the number of sectors of one track turn; T1 is the time interval necessary for changing the record/reproduce head by one track-turn back; T2 is an interval necessary for scanning one sector by the record/reproduce head; and [T1/T2] shows a least natural number more than T1/T2. That is, kicking back every N sector makes timing of start for reading/writing earlier.

According to the present invention there is provided a data recording/reproducing apparatus of spiral track system with kick back control comprising: a disc driver for rotating a disc; a record/reproduce head for recording/reproducing (or retrieving) a record/reproduce (or retrieved signal on and from the disc and for reproducing an address signal; a record/reproduce circuit for producing the record signal from the input data, reproduce data from the reproduce signal, and the address data from the address signal; a head tracking circuit responsive to a tracking signal of the spiral track for tracking the head along the spiral track; a head shifting circuit responsive to the address data and an access command for changing track-turn position of the record/reproduce head such that the record/reproduce head makes access to an address indicated by the access command, through a calculation from the address and a present address data detected by the record/reproduce head, the head shifting circuit further changing a track-turn position of the record/reproduce head by one track turn back directly in response to a kick signal; an error detector responsive to the address data, the access command, the input data, and the reproduce data for producing an error signal by checking that the address signal is not detected within a given interval from reception of the access command and that a correction cord included in the read data is consistent with the rest of the read data; a register for storing a mode signal in response to a register control signal and the error signal and for producing the kick signal in accordance with a given relation defined by the error signal in response to the address signal; and a controller for controlling the driver, the record/reproduce head, the shifting circuit, the head tracking circuit, and the record/reproduce circuit so as to record and/or reproduce data on and from the disc at desired positions, the controller can drive the head shifting circuit to directly change the track-turn position of the record/reproduce head by one track turn back.

According to the present invention there is also provided a data recording/reproducing apparatus of spiral track system with kick back control as described in the first apparatus, wherein the register produces the kick back signal when the error signal is present, or when the error signal is absent with the value set in the register.

According to the present invention there is further provided a data recording/reproducing apparatus of spiral track system with kick back control as described in the first apparatus, wherein the track turn is divided into plural sectors each sector including an address signal and the controller writes the mode signal into the register at every sector in response to the address signal, the $N = M - [T1/T2]$, where M is the number of sectors per one track turn; T1 is a time interval necessary for changing the record/reproduce head by one track-turn back by the head shifting circuit; T2 is an interval necessary for scanning one sector by the record/reproduce head; and $[T1/T2]$ shows a least natural number more than $T1/T2$.

BRIEF DESCRIPTION OF THE DRAWINGS

The object and features of the present invention will become more readily apparent from the following detailed description taken in conjunction with the accompanying drawings in which:

FIG. 3 shows a flow chart of the data recording/reproducing apparatus of the FIG. 1 embodiment;

FIGS. 10 and 11 are flow charts of the FIG. 9 prior art apparatus.

The same or corresponding elements or parts are designated as like references throughout the drawings.

DETAILED DESCRIPTION OF THE INVENTION

Hereinbelow will be described an embodiment of the invention with reference the drawings.

Figure 1:
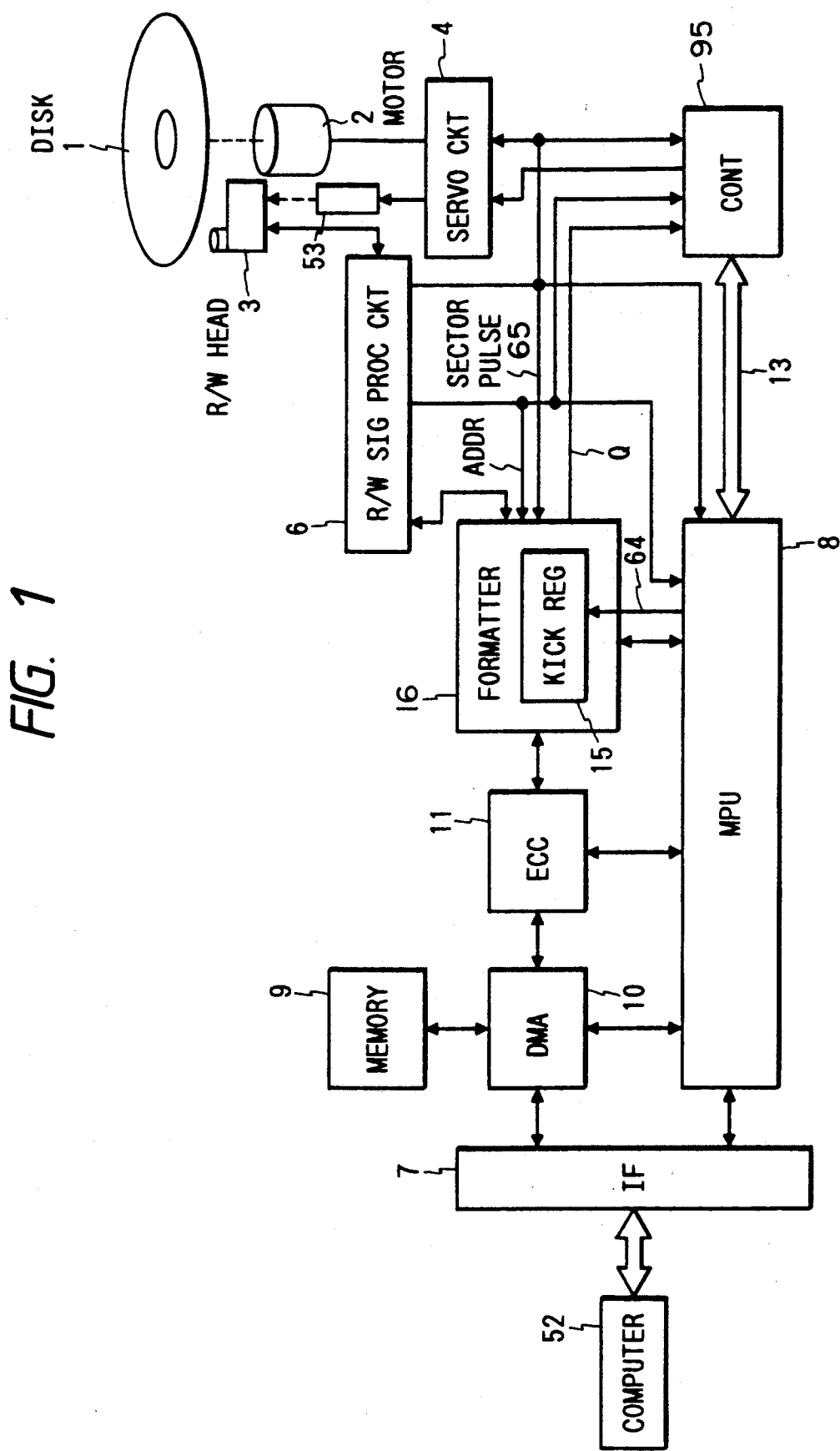
FIG. 1 is a block diagram of an embodiment of a data recording/reproducing apparatus of a spiral track system with back control.
Figure 5:
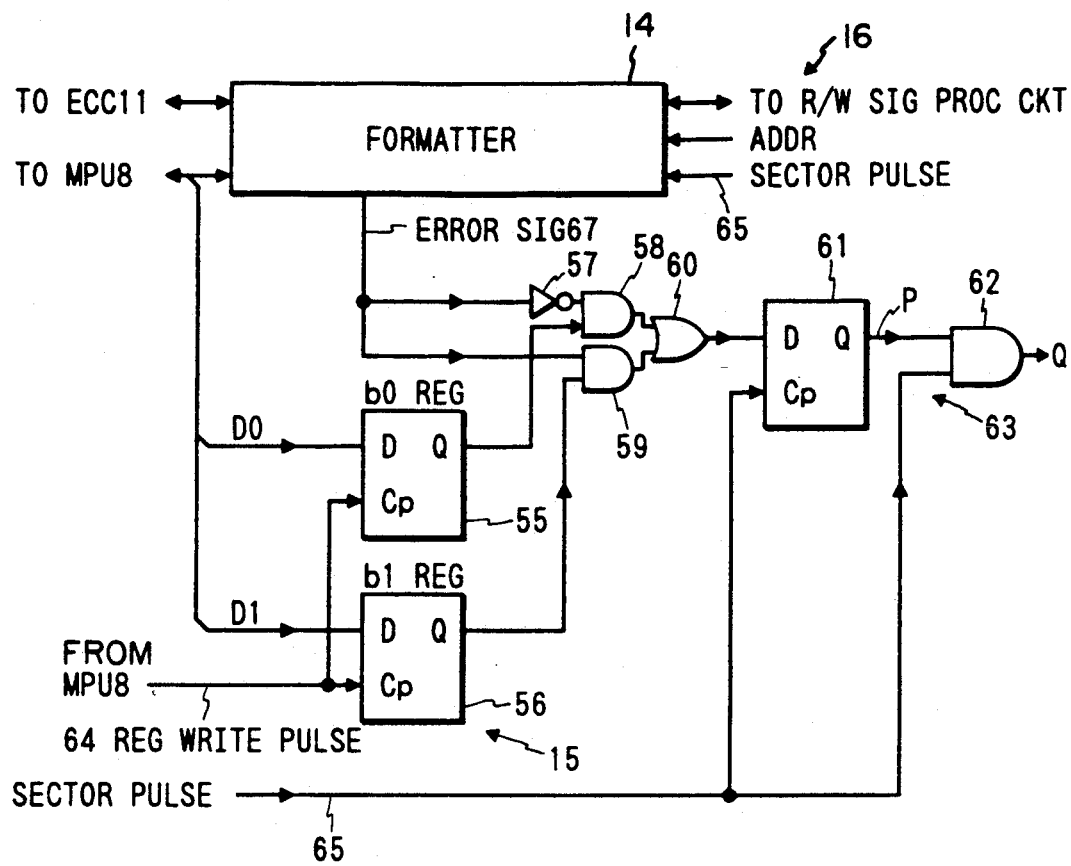
FIG. 5 is a block diagram of the formatter shown in FIG. 1.
Figure 6A:
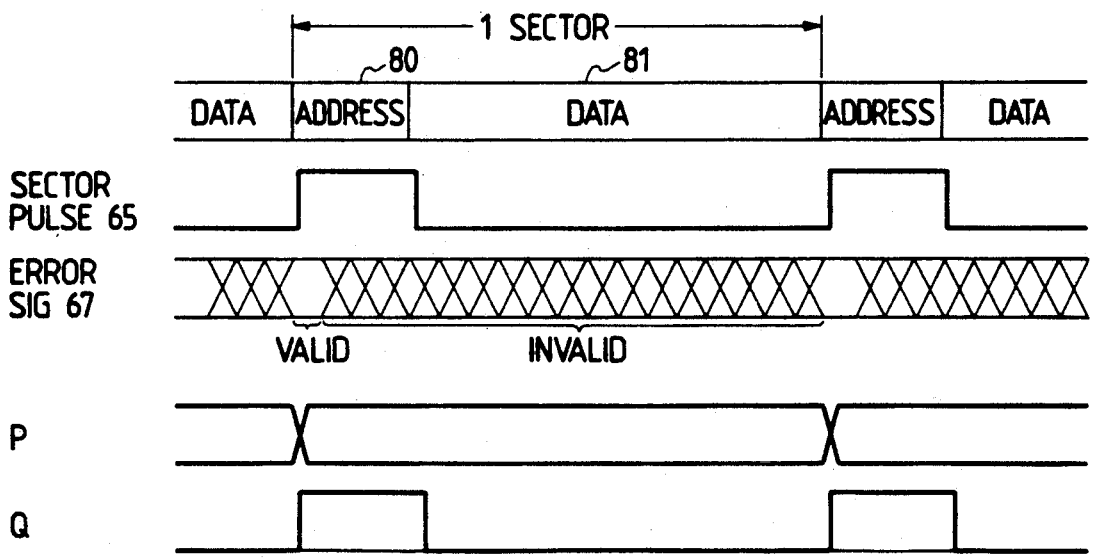
FIG. 6A is a timing chart of the apparatus of the embodiment.
Figure 6B:
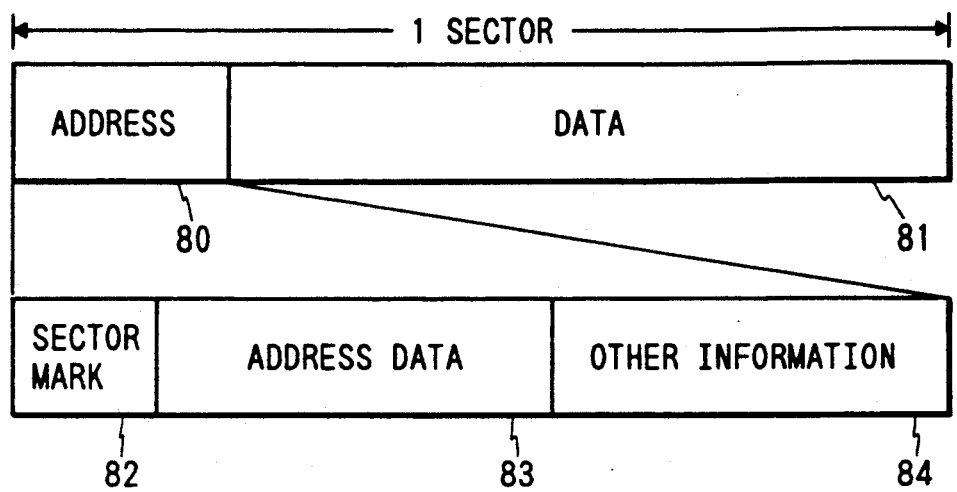
FIG. 6B is a schematic illustration showing structure of data train read out by the apparatus of the embodiment.

FIG. 1 is a block diagram of a data recording/reproducing apparatus of spiral track system with kick back control of the embodiment of the invention. In FIG. 1, this apparatus of the embodiment comprises: a drive motor 2 for rotating a disc having a spiral track; a servo circuit 4 for driving the motor 2 and for driving a read/write (transducer) head 3 through an actuator 53; a controller 95 for controlling the head position and the motor rotation; a microprocessing unit (MPU) 8 for receiving and sending command and status from/to an external computer unit 52 through an interface circuit 7; a data processing unit including a direct memory access controller (DMA) 10, a memory 9, an error correction circuit (ECC) 11, a formatter 16, and a read/write signal processing circuit 6. In write mode, data received from the external computer unit 52 is stored in the memory 9 using the DMA 10. The ECC 11 adds error correction codes to the received data and sends it to the formatter 16 for formatting the data which sends the data to the read/write (r/w) processing circuit 6. FIG. 5 is a block diagram of the formatter 16. FIG. 6A is a time chart showing timing relation between the kick back control signal Q and the sector pulse 65, etc. FIG. 6B shows the structure of a sector written in the disc 1. The formatter 16 checks errors of writing by checking address within a given interval, which address is previously written on the disc 1 and is read by the read/write signal processing circuit 6. The read/write signal processing circuit 6 writes the data and other additional information, for example, error correction codes on the disc 1 along a spiral track by intermittently turning-on a laser provided in the read/write head 3 in response to the sector pulse 65 defining the start of one sector. The sector pulse 65 is produced from a sector mark 82 which is reproduced by time-division read/write operation. In read mode, data is read by the read/write head 3 and is received by the read/write signal processing circuit 6. The read data is deformatted by the formatter 16 which checks read error and sends the result to the microprocessing unit 8.

Figure 2:
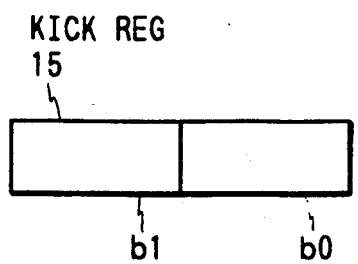
FIG. 2 is a schematic illustration of operation of a kick register of the first embodiment.

In FIG. 5, the new formatter 16 comprises a conventional formatter 14, a kick register 15 having a D latch b0 register 55 and D latch a b1 register 56, and a logic circuit 63 including an inverter 57, AND gates 58 and 59, an OR gate 60, D latch 61, and an AND gate 62. A D input of the b0 register 55 responds to a data bit D0 of the data bus line of the microprocessing unit 8 and a clock pulse input CP responds to a register write pulse 64 from an output port of the microprocessing unit 8. A D input of the b1 register 56 responds to a data bit D1 of the bus line of the microprocessing unit 8 and a clock pulse input CP responds to a register write pulse 64 from the microprocessing unit 8. The microprocessing unit 8 sets the b0 register 55 to 1 in response to the result of a step 301 shown in FIG. 3 mentioned later. The microprocessing unit 8 sets the b1 register 56 to 1 in response to the result of a step 301 shown in FIG. 3. Q outputs of the b0 register 55 and b1 register 56 are sent to the logic circuit 63 whose inverter 57, AND gates 58 and 59, and OR gate 60 produce a logic signal having the logic relation shown in FIG. 2. The D latch 61 and the AND gate 62 produce a kick back control signal Q from the output of the OR gate 60 in response to the sector pulse 65. In FIG. 6A, a sector pulse 65 is generated just after address portion 80 is detected. The kick back control signal Q is produced in response to the sector pulse 65 at the top of the sector.

When an error occurs during reading/writing data, the microprocessing unit 8 sends a command to the controller 95 to locate the head 3 at the sector just read/written to start reading/writing again. The microprocessing unit 8 sends the command in accordance with the flow chart shown in FIG. 3.

In FIG. 3, at the first step 304, the microprocessing unit 8 sets the number of sectors read/written by one operation to a variable A. The microprocessing unit 8 sets the b1 register 56 to 1 in the following step 300. In the following step 301, a decision is made as to whether the next sector is the last one of this track turn or is the last one for recording data sequence. If YES, the microprocessing unit 8 sets the kick register b0 to 1. If NO, the microprocessing unit 8 sets the kick register b0 to 0. In the succeeding step 102, the microprocessing unit 8 sets read/write mode for the next sector in the formatter 14. In the succeeding step 306, the microprocessing unit 8 waits termination of the formatter movement. In the following step 103, a detection is made as to whether any errors occurred. If YES, processing returns to the step 301 and reads/writes the erroneous sector again. If NO, processing proceeds to step 305 where A is decreased by one. In the following step 106, a decision is made as to whether all data is read and/or whether writing finished. If YES, processing ends. If NO, processing returns to step 301. Controlling of read/write sectors is actually carried by the formatter 14 while the microprocessor 8 is waiting on step 306. That is, the formatter 14, getting commands from the microprocessor 8, starts writing for the address that the read/write shall be executed, upon finding that address, starts read/write action and at the end of that sector, terminates read/write.

Therefore, the head 3 is kicked back when read/write fails and when read/write succeeds and verification is carried out after read/write of the last sector of each unit sectors read/write or after read/write of the last sector of the data sequence by the controller 95 in response to the kick back control signal Q.

Figure 7:
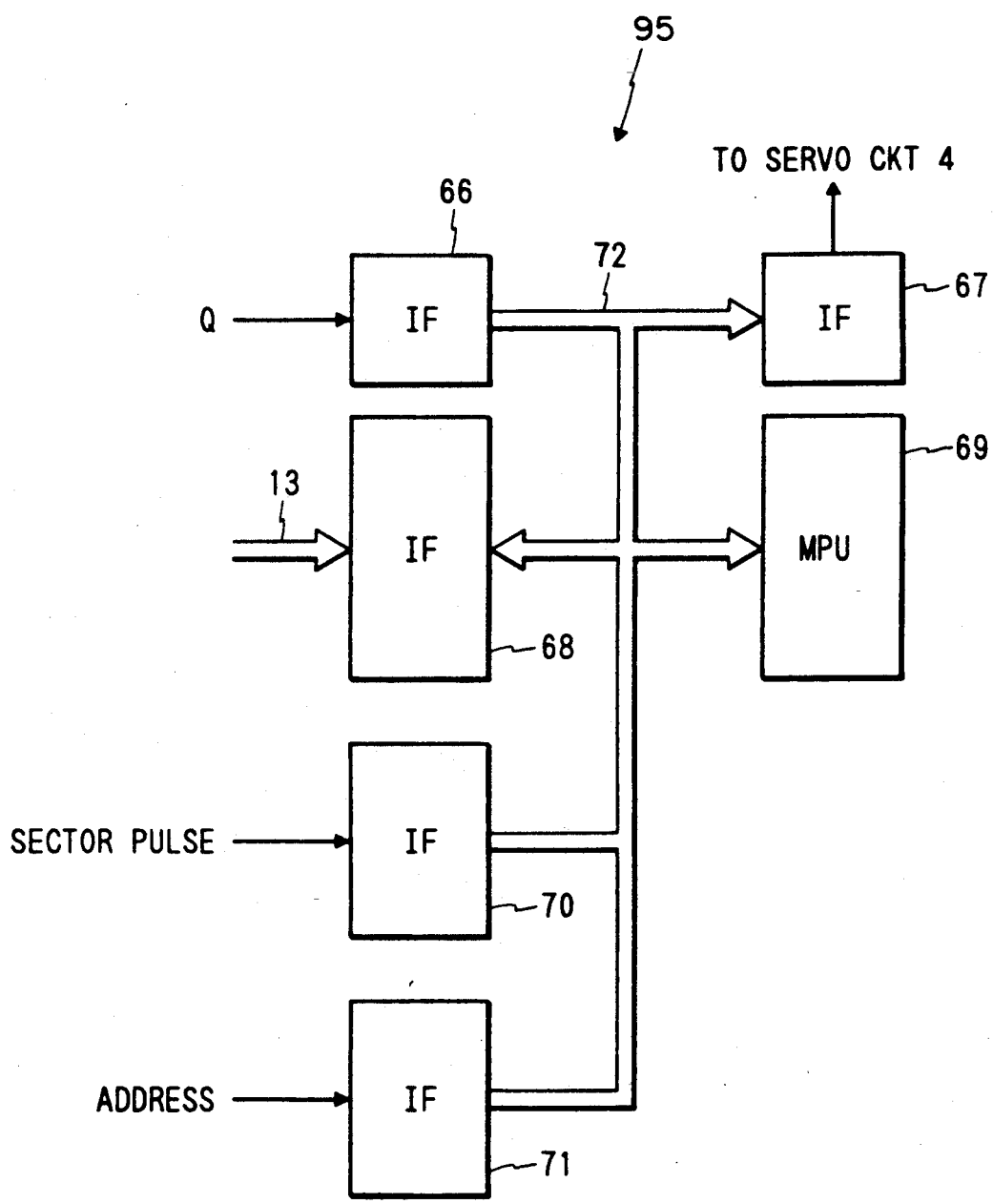
FIG. 7 is a block diagram of a controller shown in FIG. 1.

FIG. 7 is a block diagram of the controller 95. In FIG. 7, the controller 95 comprises: a microprocessing unit 69; an interface 68 for communicating data between the microprocessing unit 8 and microprocessing unit 69; an interface 66 for receiving the kick control signal Q and sending it to the microprocessing unit 69; an interface 70 for receiving the sector pulse 65 and sending it to the microprocessing unit 69; an interface 71 for receiving the address signal from the read/write signal processing circuit 6 and sending it to the microprocessing unit 69; and an interface 67 for sending a head moving signal to the servo circuit 4. The controller 95 includes the interface 66 and a program for processing the kick control signal Q in addition to the structure of the controller 95 of the prior art.

Figure 8:
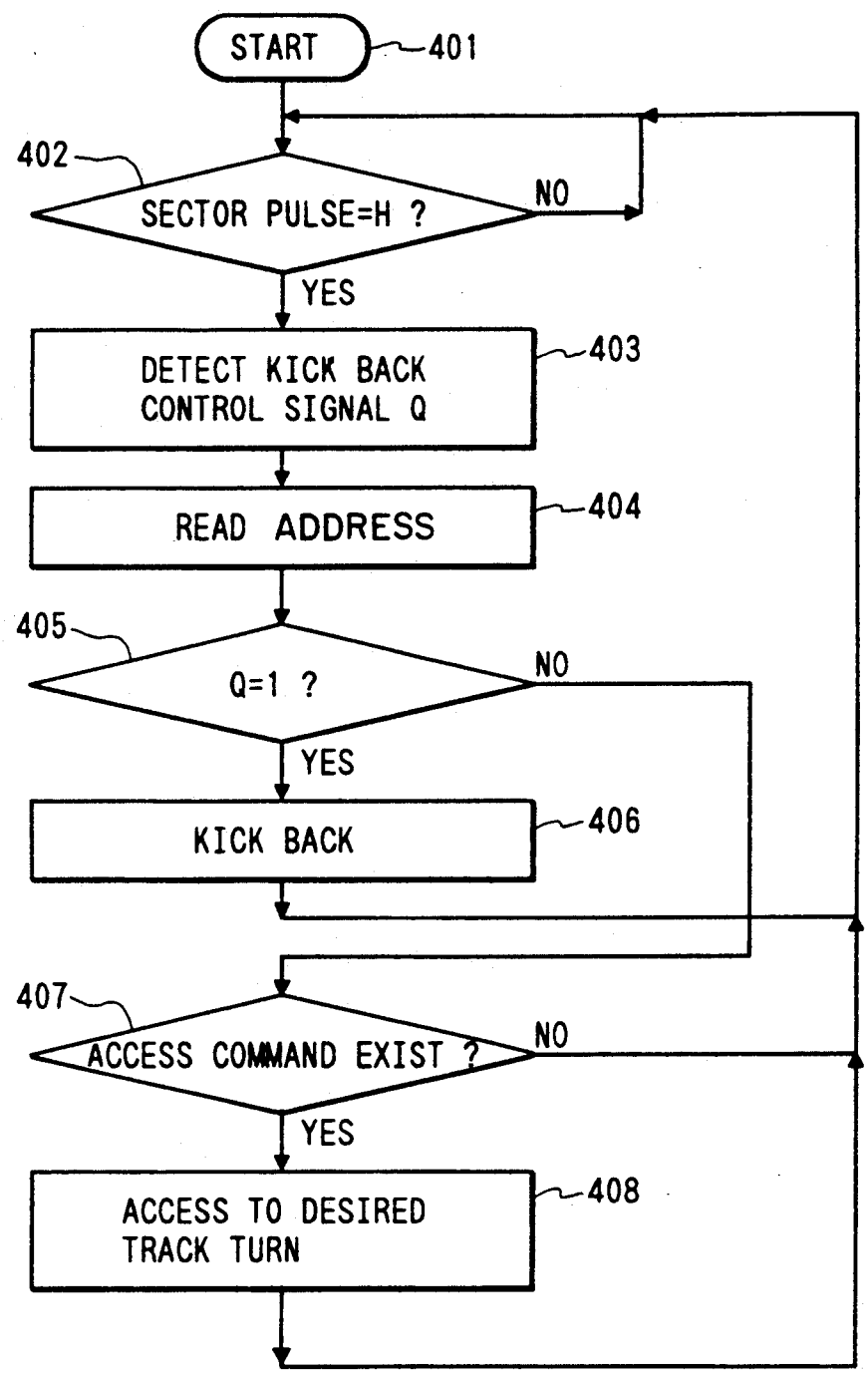
FIG. 8 shows a flow chart of the controller of the embodiment.
Figure 9:
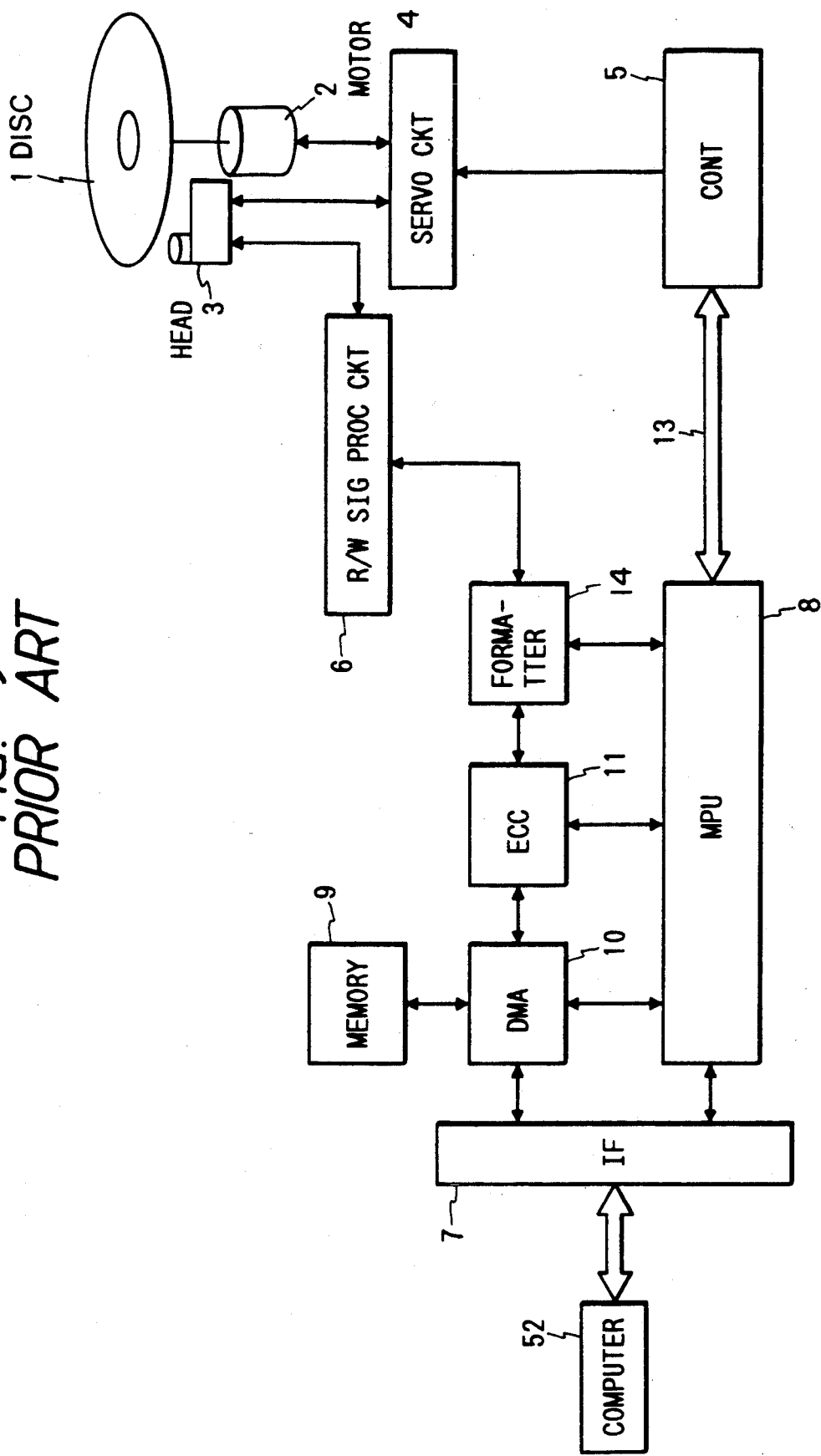
FIG. 9 is a block diagram of a prior art disc recording/reproducing apparatus.
Figure 10:
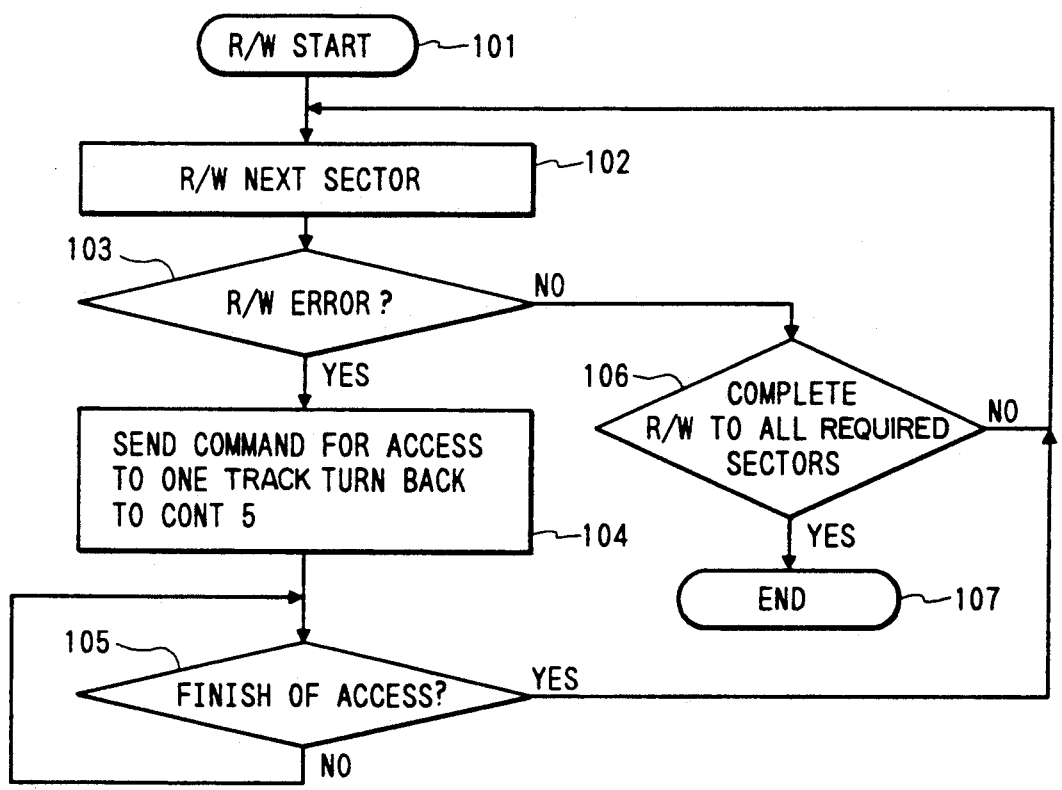

FIG. 8 shows a flow chart of the controller 15. In FIG. 8, processing starts at step 401. In the following step 402, a decision is made as to whether the sector pulse 65 is H. If YES, the microprocessing unit 69 detects the kick back control signal Q in step 403. In the following step 404, the microprocessing unit 69 reads out an address. In the following step 405, a decision is made as to whether the kick control signal is 1. If YES, the microprocessing unit 69 performs the kick back operation in step 406, i.e., changes head position by one track turn back by sending a head moving signal. If NO, the processing proceeds to step 407 where a decision is made as to whether an access command exists. If YES, the microprocessing unit 69 sends the head moving signal to the servo to more the head 3 to the desired track turn in step 408. If NO in step 407, processing returns to step 402. After processing of the step 408, processing returns to step 402.

In step 408, the microprocessing unit 69 calculates the number of track turns of head position jump for locating the head 3 at a desired track turn from the address read in step 404 and the access command in step 407. Therefore, an interval necessary for producing the head moving signal in the step 408 is longer than that necessary for performing the kick back operation in step 406.

The access command from the microprocessing unit 8 occurs at any time within one sector. Thus, the microprocessing unit 69 cannot start the access operation until the next address signal. On the other hand, the kick back control signal Q is produced at the top of the sector and the microprocessing unit 69 watches the kick back control signal Q in step 405 of FIG. 8. Thus, the microprocessing unit 69 determines whether the kick back operation should be made at the top of the sector, so that the kick back operation can be made instantaneously.

Hereinbelow will be described unit length of one writing operation of this embodiment.

Figure 6C:
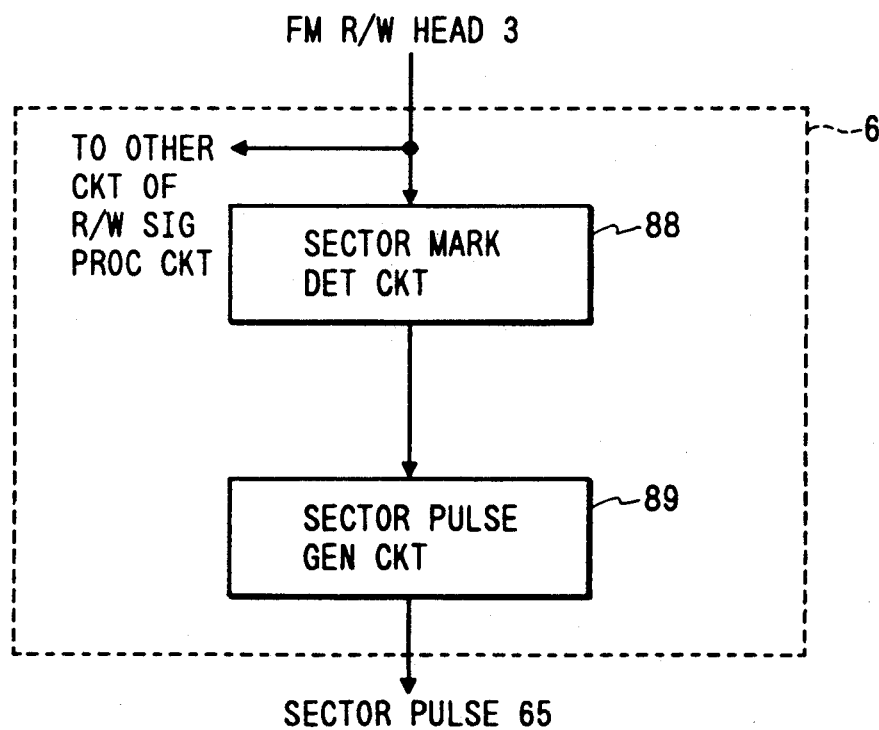
FIG. 6C is a block diagram of a circuit for generating the sector pulse included in a read/write signal processing circuit of FIG. 1.

In FIG. 6B, one sector includes address portion 80 and a data portion 81. The address portion 80 has a sector mark 82 at top of the sector, where unity codes are written with address data 83, and other information 84. FIG. 6C is a block diagram of a circuit for generating the sector pulse 65. The sector mark 82 is read by the read/write head 3 and is sent to the read/write signal processing circuit 6. A sector mark detection circuit 88 included in the read/write signal processing circuit 6 is supplied with the signal from the read/write head 3 and detects the sector mark 82. An output of the sector mark detection circuit 88 is sent to the sector pulse generation circuit 89 which generates the sector pulse 65. The sector pulse 65 is supplied to the formatter 14, the microprocessing unit 8, controller 95, and the servo circuit 4.

In this apparatus of the embodiment, unit length of one operation of writing and reading is determined as follows:

$$N = M - [T1/T2] \quad (1)$$

where N is the number of the sectors read/written by one operation; M is the number of sectors per track; T1 is a time interval for kick back operation; T2 is a time interval necessary for scanning one sector; and [T1/T2] is the smallest integer that is greater than T1/T2.

Figure 4:
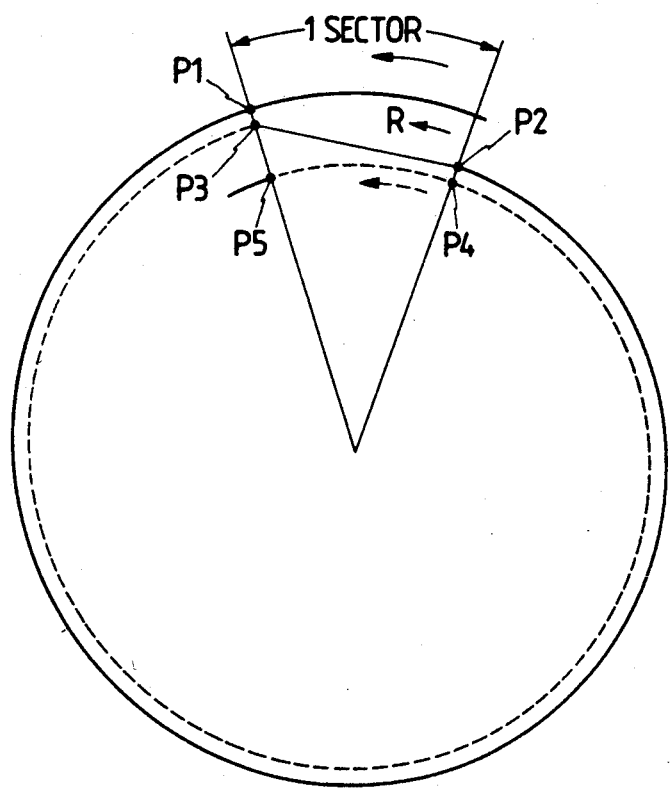
FIG. 4 is a schematic illustration of operation of the kick back of a read/write head.

This structure enables the following operation with reference to FIG. 4. FIG. 4 is a schematic illustration showing a head scanning trace along a spiral track. In this case, it is assumed that [T1/T2]=1 in above equation (1). In FIG. 4, the read/write head 3 starts writing at a point P1 and writes data along a solid line to a point P2. At the last sector of write, the register is set for kick when read/write succeeds, so that the read/write head 3 moves along a path R, i.e., kicks back, to a point P3 and then starts reading the written data for verification. It moves along a chain line to a point P4 where verification is finished and then, starts writing again after point P4. That is, the track-turn position of the head is changed by only one track turn to of access of the head 3 to the top of the just written sectors.

As mentioned, when many sectors are written, writing and verification operations are repeated alternately at every unit time interval determined by subtracting an interval necessary for kick back operation from an interval necessary for one track turn scanning. In other words, the unit number of sectors for read/write at once is determined by the Eq. (1).

If the interval of the kick back operation is less than the interval of one sector scanning, as shown in FIG. 4, the read/write head 3 reaches the adjacent track within one sector scanning interval. As shown, this case shows the most efficient operation for verification.

As mentioned earlier, the head position is controlled in accordance with the flow chart of FIG. 3. In step 304, the number of the sectors read/written by one read/write operation is set to a variable A which is decreased by one in step 305. In step 301, it is checked whether the next step is the last sector of the unit read/write operation. If YES, the microprocessing unit 8 sets the kick register b0 to 1 in step 302. At the occurrence of the sector pulse 65 after writing data on the last sector, the kick back control signal Q is produced in the formatter 14 and is sent to the controller 95 to perform the kick back operation. Thus, the head position is changed as shown in FIG. 4.

What is claimed is:

1. An apparatus for recording data onto or retrieving data from a disc along a spiral track, comprising:
    (a) disc drive means for rotating said disc;
    (b) transducer head means for recording record signals onto said disc or retrieving reproduce signals from said disc, said transducer head means further retrieving address signals from said disc;
    (c) circuit means for producing a record signal from input data, reproduce data from a reproduce signal retrieved by said transducer head means, and a first address data from an address signal retrieved by said transducer head means;
    (d) head tracking means responsive to a tracking signal provided from said disc along said spiral track for tracking said transducer head means along said spiral track;
    (e) head shifting means responsive to said first address data and an access command provided by a controller means for positioning said transducer head means to access an address on said disc indicated by said access command via calculation of said first address data and a second address data being detected on said disc by said transducer head means, said head shifting means further changing a track-turn position of said transducer head means by one track turn back directly in response to a kick signal;
    (f) error detection means for producing an error signal based on determination of whether said address signal is detected within a predetermined time interval from reception of said access command and whether a path for said transducer head means to travel about said disc is consistent with said reproduce data; and
    (g) control means for controlling said disc drive means, said transducer head means, said shifting means, said head tracking means, and said circuit means so as to record data onto and retrieve data from said disc at desired positions, said control means responsive to an input mode signal for producing a register control signal and sending said mode signal to a register means to produce said kick signal in accordance with a predetermined relationship between said error signal and said mode signal in response to said address signal, to thereby cause said head shifting means to directly change said track-turn position of said transducer means by one track turn back.

2. An apparatus as claimed in claim 1, wherein said register means produces said kick signal in the presence of said error signal or in the absence of said error signal with value of said register means.

3. An apparatus as claimed in claim 1, wherein said spiral track is divided into plural sectors by said address signal and said control means inputs said mode signal into said register means at every N sectors in response to said address signal, wherein N=M−[T1/T2], where M is the number of sectors of said track; T1 is the time interval necessary for said head shifting means to change said transducer head means by one track-turn back; T2 is the time interval necessary for said transducer head means to scan one sector of said track; and [T1/T2] is the smallest integer that is greater than T1/T2.

* * * * *